United States Patent [19]

Bohart et al.

[11] 4,285,658
[45] Aug. 25, 1981

[54] SELF-CENTERING BLOW MOLD

[75] Inventors: Paul R. Bohart; Joseph F. Gibbemeyer, both of Cincinnati, Ohio

[73] Assignee: Cincinnati Milacron Inc., Cincinnati, Ohio

[21] Appl. No.: 117,497

[22] Filed: Feb. 1, 1980

[51] Int. Cl.$^3$ .............................................. B29C 17/07
[52] U.S. Cl. .................................. 425/538; 425/525; 425/526; 425/533; 425/541; 425/451.6
[58] Field of Search ............... 425/526, 533, 541, 538, 425/450.1, 451.6, 525

[56] References Cited

U.S. PATENT DOCUMENTS

| | | |
|---|---|---|
| 2,331,687 | 10/1943 | Hobson . |
| 2,853,736 | 9/1958 | Gussoni . |
| 3,100,913 | 8/1963 | Dematteo . |
| 3,734,671 | 5/1973 | Talasz . |
| 3,767,341 | 10/1973 | Siebelhoff ................ 425/541 X |
| 3,776,991 | 12/1973 | Marcus . |
| 4,105,391 | 8/1978 | Aoki . |

FOREIGN PATENT DOCUMENTS 53-22096  7/1978  Japan .

*Primary Examiner*—Jan H. Silbaugh
*Attorney, Agent, or Firm*—Daniel P. Worth

[57] ABSTRACT

A self-centering blow mold for a rotary indexing blow molding machine has at the blow station a system for obtaining and keeping alignment among the chordally arranged blowing pins, neck rings, and blow molds. This self-centering system includes a toggle system which moves one set of the blow molds radially past alignment with the blowing pins to an overcenter position and a fluid operated drive means that thereafter moves the other of the set of blow molds radially in the opposite direction until it is in alignment with the first mentioned blow mold at the overcenter position and then continues moving to force both blow molds together, compress the toggle system, and to where the blow molds, neck rings and blowing pins are all aligned. There is also provided means for engaging the neck rings by the toggle system molds and fluid driven molds, respectively, so that alignment is achieved and maintained. The means for engaging includes biasing means consisting of a resilient member such as a spring. In normal application, it is contemplated that the toggle system and drive means will be respectively disposed on the opposite sides of a frame member having a channel or U-shaped frame.

10 Claims, 5 Drawing Figures

SELF-CENTERING BLOW MOLD

BACKGROUND OF THE INVENTION

The present invention relates to an improvement in an indexing rotary blow molding macine for making a product such as a bottle, container, or other hollow object from thermoplastic resin material. An aspect of the invention relates to such a machine for blow molding such a product form polyethylene terephthalate (PET). An aspect of the invention is a machine to blow mold a plurality of PET bottles from preforms which in turn have been injection molded at one of the work stations on the machine.

Without intending to be limited thereto, the present invention will be described with reference to an indexing rotary injection stretch blow molding machine for making bottles from PET. The general type and construction of such a machine is already known and is described in a number of patents and publications. The state of the art embraces a four station indexing rotary machine for: at a first station injection molding preforms each shaped like a test tube; at a second station heating and/or cooling or both to adjust the temperature level and heat content of the preforms to a level suitable for blow molding; at a third station blow molding the preforms into a bottle; and at the fourth station ejecting the preforms. A neck ring forms part of the injection mold and also serves to hold and move the workpiece molded therein thence and through the cycle of events. The machine then repeats the cycle. Actually, enough mechanism is provided on the machine so that each of the four work stations has work in process at the same time. Moreover, more than one container can be made on the machine at the same time.

A variety of plastics (acrylonitrile, PET) may be used, but a material preferred for making containers, especially those for carbonated beverage bottles, is PET which can be treated on the machine so that the end product bottle is biaxially oriented thereby maximizing the properties of the material while minimizing the quantity of material required.

The present invention is concerned with improving the construction and operation of the blow molding station, e.g. the third station as described above.

As will be seen in the annexed drawings, one state-of-the-art design has the orientation of the neck rings chordal instead of radial. The present machine is described as making at least four bottles at a time where molds and cooperating apparatus are arranged along a chord. Commercial embodiments of the present invention already make six and eight bottles at a time from PET.

In any event, at the blow molding station where the blow molds and neck rings are arranged chordally, there has appeared a significant alignment problem where the blow pin, blow mold, and neck rings have been difficult to get aligned and to keep aligned. Failure to achieve proper alignment results in bottles having necks offset from their bodies and in some instances, flashing. This is because structure of the machine uses a channel shaped frame and the forces clamping the blow mold flex the flanges of the channel and allow misalignment to occur.

The present invention provides an improvement, namely a system for obtaining and keeping alignment among a blowing pin, a neck ring, and the blow mold. This improvement, stated in the simplest and broadest terms is a provision of a toggle system with an overstroke that pushes one of the blow mold halves past center at which point the toggle links assume the well-known straight line and rigidified relationship; the other blow mold half is then driven by hydraulics or pneumatic cylinders into engagement therewith, using such force as is necessary to push the first mentioned mold half back on center. Appropriate means on each mold half engage the neck ring in which the preform has been held all this time.

More specifically, my invention includes in an indexing rotary machine for blow molding more than one bottle at a time from a succession of respective preforms of thermoplastic material by moving said preforms while supported only by the neck from a chordally aligned split neck ring into a position between an initially spaced-apart pair of movable blow molds with each preform being aligned with a female cavity in each blow mold, said split neck ring having at least two parts that are movable relative to each other along a radius extending from the axis about which said ring is rotated in an indexing fashion, the improvement of a system for obtaining and keeping alignment between or among said neck ring and said blow molds which comprises:

a toggle system means for reciprocating one of said blow molds radially relative to said axis between an open position that permits said neck rings with preforms and with bottles blown from such preforms to index in to and away from, respectively, said position between without interference with said one blow mold and at least into the intended alignment at a center position;

a drive means to move the other of said blow molds radially of the machine and into engagement with said one blow mold;

at least one of said toggle system means and drive means for driving that blow mold linked thereto past a predetermined center (intended center) position to an overcenter position and the other of said toggle system means and drive means for driving the remaining said blow mold (remaining mold) against the linked blow mold and both blow molds together from said overcenter position until both molds and neck ring parts are aligned for blowing at the intended center position;

mold contact means on at least one of the aforesaid blow molds, toggle system, and drive means and that one of said neck ring parts closest thereto for establishing contact therebetween after which contact they travel to said overcenter position together; and bias means on at least one of said blow molds for biasing said neck ring parts together and the neck ring against the other of said blow molds.

Other objects, advantages and features will become apparent from a reading of the following specification together with the annexed drawings wherein:

FIGS. 1a and 1b, respectively, illustrate features of the prior art wherein 1a shows the ideal relationship among neck rings, blow mold halves, and blow pins; and where FIG. 1b illustrates in exaggerated style the flexing of the blow mold support flanges and the offcenter relationship of neck ring to blow mold which results;

Figure 3:
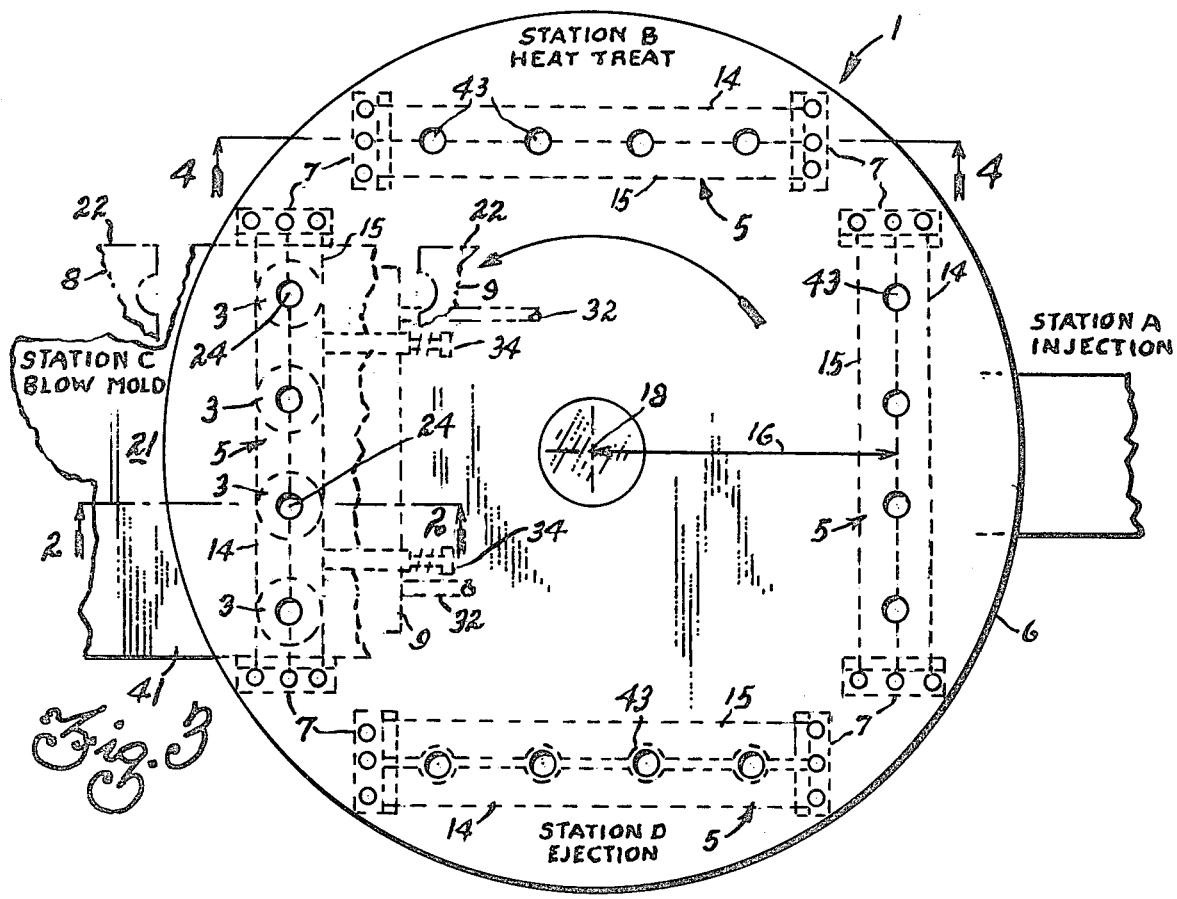
FIG. 3 is a plan view of an assembled indexing rotary machine of the general type illustrated here, section 2-2 being that along which are taken FIGS. 1a, 1b and 2.
Figure 4:
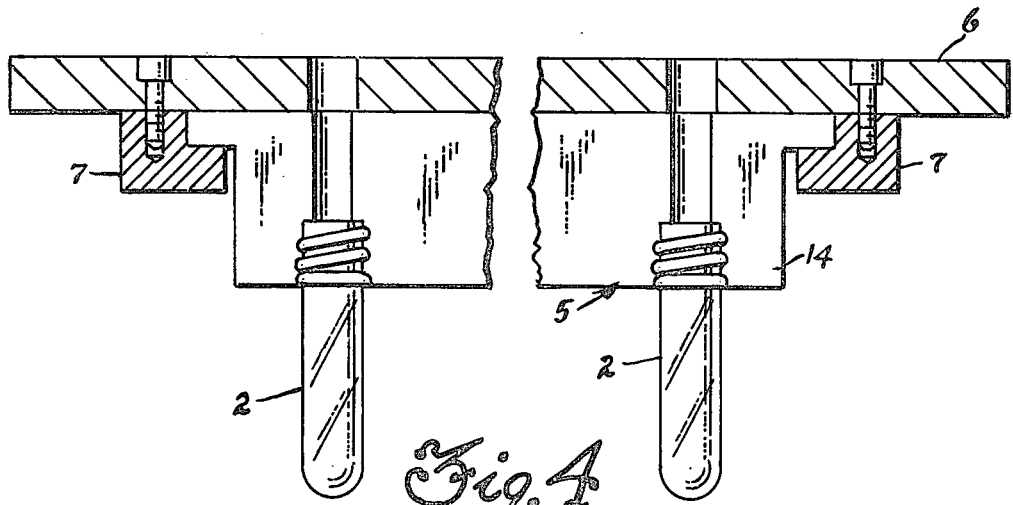

FIG. 4 is a partial broken-away section view through the neck rings at the second or heat treating station along section 4-4 of FIG. 3.

The reader should keep in mind that the present invention is an improvement in one portion of a much larger machine known to the prior art for making products of this sort, e.g. hollow articles, especially plastic bottles.

Turning now to FIG. 3, there is a plan view schematically illustrating an indexing rotary machine 1 having a preform 2 injection molding work station A, a preform heat treating—preferably reheating—work station B, a blow molding station C at which the preform is expanded by internal pressure to form the final hollow product preferably a bottle 3, and a fourth work station D where ejection of the product takes place.

Figure 1A:
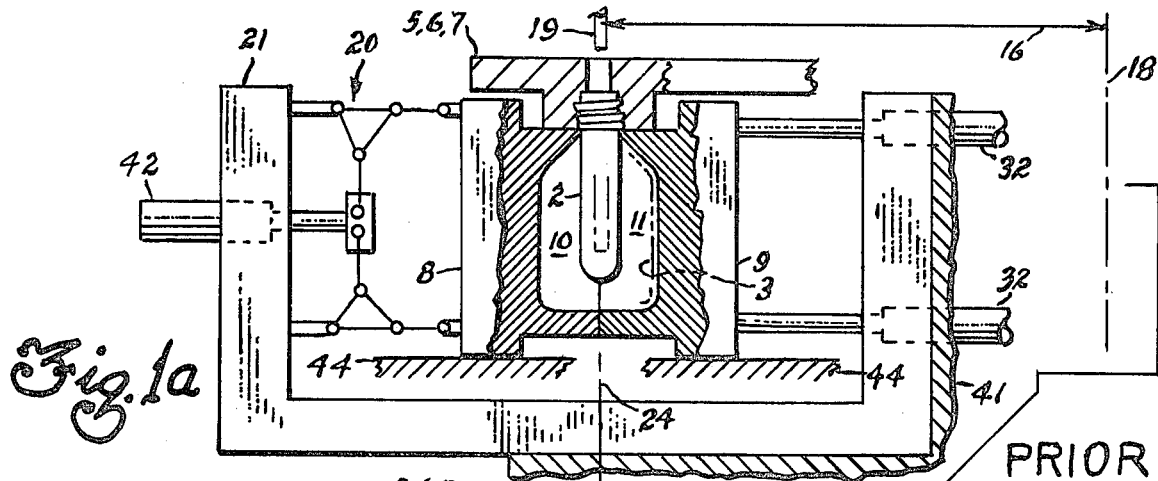

FIG. 4 illustrates some details of a very common embodiment of the preform 2 which, broadly speaking, is an elongated hollow object closed at one end and externally threaded at the other resembling a test tube threaded at one end. Such a shaped preform is commonly used for the manufacture of carbonated soft drink beverage bottles made of thermoplastic material such as PET. The configuration of the bottle is shown in FIGS. 1a and 3 by way of example.

In order to make the bottle, it is contemplated that the machine 1 will manufacture more than one bottle at a time and will move the preforms 2 while suspended only by the neck from a split neck ring assembly 5 which in turn is supported from the carrier plate 6, the latter also being known as a carrier or turret. As will be described below the neck ring assembly 5 actually constitutes part of the injection mold when same is at station A and thereafter acts as a holding and transporting means as well as cooperating with apparatus at the other work stations to achieve heat treating, blow molding and ejection.

The neck ring assembly 5 contemplated here (in combination with the other parts of the machine 1) is intended to make more than one bottle at a time to which end a plurality of preforms 2 is molded at injection station A. Moreover, the preforms and the apparatus to make and operate upon them are arranged along a chord of the carrier 6 rather than upon a radius of it. Anyway, the chordally aligned split neck ring assembly 5 is indexably rotated (two 90 degree indexes) into position at blow molding station C between an initially spaced apart pair of radially movable blow molds 8,9 so that each preform is aligned properly with the female cavity 10,11 in the respective blow molds.

The neck ring assembly 5 has a pair of matching parts 14,15 (FIGS. 2,3) that are movable relative to each other and the carrier 6 along a radius 16 that extends from the axis 18 (FIG. 3) about which the carrier with its associated parts such as the neck ring assembly, etc. is rotated in an indexing fashion and counterclockwise as illustrated in FIG. 3.

Figure 1B:
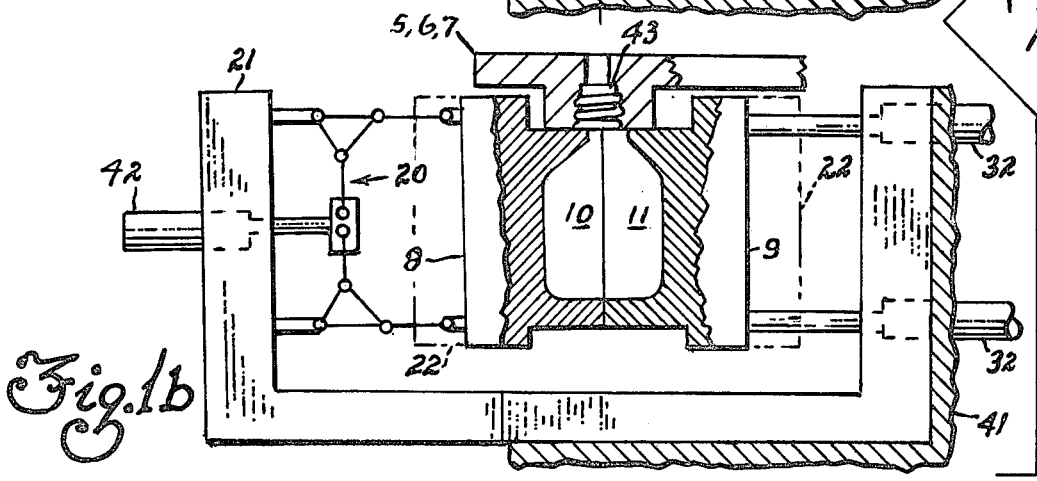

FIGS. 1a and 1b illustrate a toggle system 20 of conventional and well-known construction that reciprocates one of the blow molds 8 radially relative to axis 18. These Figs. also illustrate a blowing pin 19 and a channel shaped support member 21 within which is located the toggle 20, blow molds and other apparatus. The toggle system 20 moves blow mold 8 between the fully opened position 22 (ghost or dotted lines FIGS. 1b, 2) (note: the fully open position 22 permits the neck ring with preforms and with bottles blown from same to be rotary indexed into and out of, respectively, a position between the opened, spaced apart blow molds 8,9 without mechanically striking, i.e. without interference with, blow molds 8,9) and past alignment at the intended centerline position 24 with the blowing pin 19 (position 24 is where the center line, pin 19, preform 2, and the center plane or center of the molded object 3 all coincide) and to the overcenter position 25 of FIG. 2 at which point the toggle links of the system 20 bring their centers into a straight line to form a solid column.

The invention (FIG. 2) has a first toggle contact means 30 supported from either (one of) the mold 8 (which is preferred) or (and) from that one of the split neck ring parts 14 which is closest to the toggle 20 so that the two come properly into contact when the center lines of all of the preforms 2 coincide with the center lines of the mold cavities 10,11, shown here as the aligned position 24. Thus, the extension of the toggle 20 will cause outer mold half 8 to contact neck ring part 14 so that the two move together to the overcenter position 25.

Figure 2:
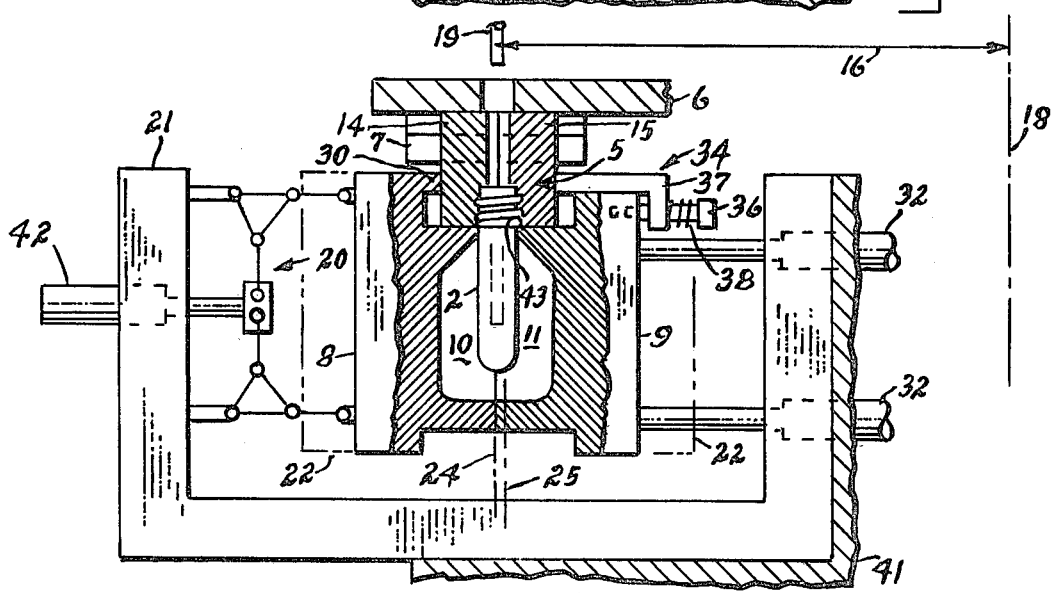
FIG. 2 illustrates the final self-centered position realized by the present invention, shows the overcenter position, and features such as the resilient biasing means attached to one blow mold half, the toggle means, and the hydraulic cylinder.

Still referring to FIG. 2, the channel 21 also supports a plurality of fluid operated drive means 32, preferably a plurality of conventionally constructed hydraulic cylinders that are secured to one of the upstanding flanges or walls of the channel and are used to move the other of the blow mold halves 9 radially into engagement with outer mold half 8 at the overcenter position 25 and to continue moving same against the toggle system while compressing the toggle system, until the center line of the blow molds, preform, neck rings, center lines, blow pin 19 come into coaxial and/or coplanar register at 24 at which position the bottles can be blown from the preforms. Compression removes mechanical slack plus stresses the toggle system to shorten links thereof.

The invention also comprehends a biasing means 34 which is an assembly for biasing the neck ring together and against the outer blow mold. Actually, a plurality of bias means 34 are preferred, two being illustrated in FIG. 3, each of which (FIG. 2) may preferably comprise a bolt 36 on which is slidably mounted an angular contact blade 37 which a helical spring 38 urges radially outwardly, the latter being compressed between the depending portion 37 and the head of bolt 36 as illustrated in FIG. 2.

At the risk of repeating what was described briefly in the introductory portion of this specification, FIGS. 1a and 1b illustrate the prior art construction as well as the problem most commonly found with it. This construction involves channel shaped frame member 21 being mounted on the machine frame 41 and between the flanges of which is radially moved the blow molding halves 8,9. Alignment problems result when the mold halves are clamped together, most commonly as illustrated in FIG. 1b, where the blow mold assembly 8,9 (and the cavities thereof, 10,11) are not aligned with the neck ring assembly 5 and its component parts 6 and 7 to blow mold a product with the machine in this configuration would result in an unacceptable part (FIG. 1b) where the neck is offset from the body of the container.

The present invention, as illustrated in FIG. 2, causes this alignment to be achieved in the manner explained above and in such a way that the various parts all come into register along the multiple axes or plane where the center lines (e.g. blow pin, neck ring, and preform, bottle cavity) coincide at each mold cavity as at 24.

Few, if any, details are here provided about the apparatus 1 and/or, for example, structure at stations A, B and D, the reason being that these are no part of the present invention and moreover are obvious, conventional and known to the prior art. For example, station A includes a conventional injection molding machine. It might be noted that the primary way of ejection at station D is to split the neck ring assembly parts 14,15 by sliding them radially apart from each other on the supports 7. This causes the blow molded products to fall away. The ring assembly parts are commonly separated at station D by driving a wedge or wedges between them although other means may be used. A pneumatic cylinder is positioned to drive the wedge(s) and the neck rings preferably are beveled on their joining surfaces to receive, guide, and assist the wedge. Knockout pins or rods may also be—and preferably are—used at D to push any stuck bottles out of the opened neck rings.

It is to be understood, as illustrated in the references listed above, and e.g. in FIG. 3 and other portions of this specification, that a split neck ring assembly 5 is provided each of the work stations and indexing of the machine moves each assembly in an indexing fashion from one work station to another, from station A through D and then repeats.

The movable blow molds 8,9 have been referred to above and illustrated as each being one massive unit. In actual practice, the machine would usually comprise a pair of slidably movable platens to which the toggle 20 and drive means 32 are respectively connected. Each platen would support thereon a mold half. This permits changing molds without having to rebuild the machine. It is to be understood that the above-description and following claims include in the term "mold" or "blow mold" a structure having a platen alone or combined with a mold and of one piece or multiple piece construction and in either case includes a single cavity and/or multiple cavities 10,11 in each mold. The center lines of multiple cavity molds, lie in one chordal plane, similarly as to intended center line 24.

Similarly, reference to the neck ring 5 contemplates at least one ring cavity 43 (FIG. 1b) and includes a plurality as FIG. 3.

Further, the fluid drive means 32 may comprise a hydraulic or pneumatic cylinder in each instance and preferably is hydraulic. On the other hand, the toggle system power source 42 preferably comprises a hydraulic cylinder although it may, of course, comprise a pneumatic cylinder.

The molds (platens plus molds, etc. as defined above) are heavy parts and preferably are supported to slide back and forth on ways 44 (FIG. 1a only). The ways are omitted from the other FIGS. to enhance the clarity of the drawings.

What is claimed is:

1. In an indexing rotary machine for blow molding more than one bottle at a time from a succession of respective preforms of thermoplastic material by moving said preforms while supported only by the neck from a chordally aligned split neck ring into a position between an initially spaced-apart pair of movable blow molds with each preform being aligned with a female cavity in each blow mold, said split neck ring having at least two parts that are movable relative to each other along a radius extending from the axis about which said ring is rotated in an indexing fashion, the improvement of a system for obtaining and keeping alignment between or among said neck ring and said blow molds which comprises:

a toggle system means for reciprocating one of said blow molds radially relative to said axis between an open position that permits said neck rings with preforms and with bottles blown from such preforms to index in to and away from, respectively, said position between without interference with said one blow mold and at least into the intended alignment at a center position;

a drive means to move the other of said blow molds radially of the machine and into engagement with said one blow mold;

at least one of said toggle system means and drive means for driving that blow mold linked thereto past a predetermined intended center position to an overcenter position and the other of said toggle system means and drive means for driving the other of said blow molds against the linked blow mold and both blow molds together from said overcenter position until both molds and neck ring parts are aligned for blowing at the intended center position;

mold contact means on at least one of the aforesaid blow molds, toggle system, and drive means and that one of said neck ring parts closest thereto for establishing contact therebetween after which contact they travel to said overcenter position together; and bias means on at least one of said blow molds for biasing said neck ring parts together and the neck ring against the other of said blow molds at least when said blow molds and split neck ring are aligned for blowing.

2. An indexing rotary machine according to claim 1 wherein the improvement further comprises:
a bias means that is resilient.

3. An indexing rotary machine according to claim 1 wherein the improvement further comprises:
a hydraulic cylinder mounted to drive said toggle system.

4. An indexing rotary machine according to claim 1 wherein the improvement comprises said drive means further comprising:
a plurality of hydraulic cylinder assemblies the plungers of which directly drive said other blow mold.

5. An indexing rotary machine according to claim 1 wherein the improvement further comprises:
a fluid operated drive means that further comprises a plurality of pneumatic cylinder assemblies the plungers of which directly drive said other blow mold.

6. An indexing rotary machine according to claim 1 wherein the improvement further comprises:
said toggle system and said one blow mold being located radially outward of said fluid operated drive means.

7. In an indexing rotary machine for blow molding from a preform of thermoplastic material by moving said preform while suspended only by the neck from a chordally aligned split neck ring substantially into a position between an initially spaced-apart pair of radially movable blow molds each having a female cavity, said split neck ring having a pair of parts movable relative to each other along a radius extending from the axis about which said ring is rotated in an indexing fashion, the improvement of a system for establishing alignment between at least said neck ring and said blow molds which comprises:

a first toggle contact means;

a toggle system for reciprocating one of said blow molds radially relative to said axis into an open position that permits said neck ring with preforms and with bottles blown from such preforms to index to and away from, respectively, said position between without interference with said one blow mold and into a position where said first toggle contact means engages that one of said blow mold and split neck ring parts on which it is not mounted and thence into a position in which links of said toggle system form a solid column;

said first toggle contact means being on one of said one blow mold and that one of said split neck ring parts closest to said toggle for establishing contact between the last said part and one of said toggle and one said blow mold and causing them to travel to an overcenter position;

a fluid operated drive means to move the other of said blow molds radially into engagement with said one blow mold at said overcenter position and to continue moving same against said toggle system until said pair of blow molds and split neck ring are aligned for blowing on coincident centers; and bias means for biasing said neck ring parts together and against said one blow mold at least when said blow molds and split neck rings are aligned for blowing.

8. In an indexing rotary machine according to claim 7, the improvement further comprising said toggle system for moving into said contact and continuing to move past or through said coincident centers to said overcenter position.

9. In an indexing rotary machine according to claim 7, the improvement further comprising said bias means to include a resilient member mounted for said biasing.

10. In an indexing rotary machine according to claim 9, the improvement further comprising said resilient member being a spring.

* * * * *